(12) United States Patent
Yeom

(10) Patent No.: US 7,116,385 B2
(45) Date of Patent: Oct. 3, 2006

(54) BACKLIGHT ASSEMBLY WITH FRAME HOUSING COMPRISING A GUIDE PORTION FOR GUIDING THE LIGHT UNIT WIRES AND LIQUID CRYSTAL DISPLAY DEVICE HAVING THE SAME

(75) Inventor: Moon Soo Yeom, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 36 days.

(21) Appl. No.: 10/847,999

(22) Filed: May 19, 2004

(65) Prior Publication Data

US 2004/0246400 A1 Dec. 9, 2004

(30) Foreign Application Priority Data

Jun. 3, 2003 (KR) .................. 10-2003-0035576

(51) Int. Cl.
*G02F 1/1333* (2006.01)
*F21V 27/00* (2006.01)

(52) U.S. Cl. ..................... 349/58; 349/65; 349/70; 362/632; 362/633; 362/634

(58) Field of Classification Search .......... 349/58, 349/70; 362/600, 630, 632–634
See application file for complete search history.

(56) References Cited

U.S. PATENT DOCUMENTS

| 2001/0017673 | A1* | 8/2001 | Lee ............................ 349/58 |
| 2002/0034064 | A1* | 3/2002 | Kim ........................... 361/681 |
| 2003/0016312 | A1* | 1/2003 | Park et al. ................... 349/58 |
| 2003/0117544 | A1* | 6/2003 | Kim et al. ................... 349/58 |
| 2005/0042913 | A1* | 2/2005 | Yu et al. ..................... 439/470 |

* cited by examiner

*Primary Examiner*—Andrew Schechter
*Assistant Examiner*—W. Patty Chen
(74) *Attorney, Agent, or Firm*—Morgan, Lewis & Bockius, LLP

(57) ABSTRACT

A backlight assembly includes a plurality of optical sheets, a frame for housing the plurality of optical sheets and a light unit, the frame having a guide portion positioned along a first side of the frame positioned from an end portion of the frame by a first distance, the guide portion having a guide hole positioned to correspond to a hole through a portion of the frame, an open upper portion positioned along a lateral direction opposing the guide hole, and an overlapping portion overlapping the guide hole to form a boundary of the open upper portion, a first wire connected to a first end of the lamp unit and inserted through the guide hole of the guide portion and the hole through the portion of the frame to be overlapped by the overlapping portion, and a second wire connected to a second end of the lamp unit and inserted through the open upper portion and the guide hole.

12 Claims, 6 Drawing Sheets

BACKLIGHT ASSEMBLY WITH FRAME HOUSING COMPRISING A GUIDE PORTION FOR GUIDING THE LIGHT UNIT WIRES AND LIQUID CRYSTAL DISPLAY DEVICE HAVING THE SAME

The present invention claims the benefit of Korean Patent Application No. 35576/2003 filed in Korea on Jun. 3, 2003, which is hereby incorporated by reference

BACKGROUND OF THE INVENTION

1. Field of the Invention

The present invention relates to a liquid crystal display (LCD) device, and more particularly, to a backlight assembly and an LCD device having a backlight assembly.

2. Description of the Related Art

In general, different types of flat type display devices are used in portable telephones, computer monitors, and television sets because of their excellent visibility and lower consumption power, and have heat emission amounts similar to cathode ray tube (CRT) device of the same screen size. The different types of flat type display devices include plasma display panel (PDP) devices, field emission display (FED) devices, and LCD devices.

In the LCD devices, a liquid crystal material, which includes liquid crystal molecules, is injected between two thin glass substrates that have specially treated surfaces. The arrangement of the liquid crystal molecules is varied by an induced electric field generated by electrodes that are disposed on facing surfaces of the two thin glass substrates in order to display images. However, since the LCD devices are not self light emitting devices, a light source, such as a lamp unit, is required for displaying the images on an image screen. For example, a backlight assembly is commonly used as the light source provided at the rear of an LCD module device that is used as an image display unit of portable computer devices, such as notebook computers and laptop computers.

FIG. 1 is a schematic construction view of an LCD module device according to the related art, and FIG. 2 is an enlarged perspective view of region A of FIG. 1 according to the related art. In FIG. 1, an LCD module device includes a liquid crystal panel 110 for displaying images, a backlight assembly 120 installed at the rear of the LCD panel 110 to function as a light source for the LCD panel 110, and a rectangular-framed metal chassis 130 for supporting and affixing the LCD panel 110 and the backlight assembly 120.

In FIG. 1 and FIG. 2, the backlight assembly 120 includes a diffuser sheet 121, a plurality of prism sheets 122 and 123, a light guide plate 123, a reflector sheet 125, and a rectangular plastic mold frame 126 for installing a light-source lamp unit 127 along one side corner thereof. The mold frame 126 houses and sequentially layers the diffuser sheet 121, the prism sheets 122 and 123, the light guide plate 124, and the reflector sheet 125 therein. In general, the diffuser sheet 121, the prism sheets 122 and 123, the light guide plate 124, and the reflector sheet 125 comprise optical sheets.

A wire 128, which includes low-voltage and high-voltage wires 128a and 128b, are electrically connected with both ends of the lamp unit 127 to supply an external power source to the lamp unit 127. In addition, an outlet portion 126b and a housing groove 126a are disposed along one-side frame of the mold frame 126, which installs the lamp unit 127 thereat. The outlet portion 126b supports and feeds the low-voltage and high-voltage wires 128a and 128b through the mold frame 126. The housing groove 126a houses and guides the low-voltage and high-voltage wires 128a and 128b to the outlet portion 126b, wherein the outlet portion 126b has an opened upper portion 130.

In FIG. 2, the outlet portion 126b is spaced away by a predetermined distance (L) from any one end of the mold frame 126. The low-voltage and high-voltage wires 128a and 128b are bent at mold frame 126 regions that respectively correspond to the outlet portion 126b and the both ends of the lamp unit 127. However, the structure of the outlet portion 126b installed along the one-side frame of the mold frame 126 is problematic since the low-voltage wire 128a and/or the high-voltage wire 128b must released through the opened upper portion 130 of the outlet portion 126b. Thus, any pulling force applied to either of the low-voltage wire 128a and/or the high-voltage wire 128b may result in damage to the low-voltage and/or high-voltage wires 128a and 128b, the lamp unit 127, and/or the mold frame 126.

FIG. 3 is a schematic construction view of another LCD module device according to the related art, and FIG. 4 is an enlarged perspective view of region B of FIG. 3 according to the related art. In FIG. 3, an LCD module device includes a liquid crystal panel 310 for displaying images, a backlight assembly 320 installed at a rear of the LCD panel 310 to function as a light source for the LCD panel 310, and a rectangular-framed metal chassis 330 for supporting and affixing the LCD panel 310 and the backlight assembly 320.

In FIG. 3 and FIG. 4, the backlight assembly 320 includes a diffuser sheet 321, a plurality of prism sheets 322 and 323, a light guide plate 323, a reflector sheet 325, and a rectangular plastic mold frame 326 for installing a light-source lamp unit (not shown) along one side corner thereof. The mold frame 326 houses and sequentially layers the diffuser sheet 321, the prism sheets 322 and 323, the light guide plate 324, and the reflector sheet 325 therein. In general, the diffuser sheet 321, the prism sheets 322 and 323, the light guide plate 324, and the reflector sheet 325 comprise optical sheets.

A wire 328, which includes low-voltage and high-voltage wires 328a and 328b, are electrically connected with both ends of the lamp unit to supply an external power source to the lamp unit. In addition, one support 329 is combined along a one-side frame of the mold frame 326 to be detachable along a vertical direction where the low-voltage and high-voltage wires 328a and 328b are fixedly supported by the support 329. Accordingly, the low-voltage and high-voltage wires 328a and 328b can be installed at the mold frame 326 in a stable manner.

In FIG. 4, an insertion groove 326c for wire outlet is integrally provided for one-side frame of the mold frame 326 that installs a lamp unit (not shown) thereat. The support 329 is fitted into the insertion groove 326c of the mold frame 326 with the low-voltage and high-voltage wires 328a and 328b. The support 329 includes a body 329a having a through hole 329c through which the low-voltage and high-voltage wires 328a and 328b can pass; and a hook fragment 329b protruded from a lower portion of the body 329a. Accordingly, the low-voltage and high-voltage wires 328a and 328b can be supported in a stable manner and passed through at a wire outlet position of the mold frame 326. Thus, it does not matter that the insertion groove 326c is provided at the end of the mold frame 326, but the insertion groove 326c can be spaced away by a predetermined distance from the end of the mold frame, as described above.

In addition, the insertion groove 326c is opened at an upper portion such that the wires 328 can be inserted and pass through along front and rear directions of the support

329. Although not shown, a hook jaw can be provided at a lower portion of the insertion groove 326*c* to allow the insertion groove 326*c* to be detachably combined with the support 329 via a hook fragment 329*b*. Accordingly, the body 329*a* of the support 329 is inserted through upper opening of the insertion groove 326*c* while the hook fragment 329*b* is elastically hooked and combined to the hook jaw (not shown), which is disposed at the lower portion of the insertion groove 326*c*.

According to the structures of FIGS. 3 and 4, which include separate supports for fixedly supporting the wire for the lamp unit, the support is inserted into and combined to the insertion groove to allow the stable combination of the wire on the mold frame and to prevent the wire from being released at an outlet position. However, the structures have increased manufacture costs is due to their required separate supports. In addition, manufacturing processes are complicated due to the insertion groove and the installation of the support thereinto.

SUMMARY OF THE INVENTION

Accordingly, the present invention is directed to a backlight assembly and an LCD device having a backlight assembly that substantially obviate one or more problems due to limitations and disadvantages of the related art.

An object of the present invention is to provide a backlight assembly having an improved lamp-wire installation structure.

An object of the present invention is to provide an LCD device having a backlight assembly with an improved lamp-wire installation structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight assembly includes a plurality of optical sheets, a frame housing the plurality of optical sheets and a light unit, the frame having a guide portion positioned along a first side of the frame positioned from an end portion of the frame by a first distance, the guide portion having a guide hole positioned to correspond to a hole through a portion of the frame, an open upper portion positioned along a lateral direction opposing the guide hole, and an overlapping portion overlapping the guide hole to form a boundary of the open upper portion, a first wire connected to a first end of the light unit and inserted through the guide hole of the guide portion and the hole through the portion of the frame to be overlapped by the overlapping portion, and a second wire connected to a second end of the light unit and inserted through the open upper portion and the guide hole.

In another aspect, a liquid crystal display includes a liquid crystal panel for displaying images thereon, a plurality of optical sheets positioned at a rear surface of the liquid crystal panel, a frame housing the plurality of optical sheets and a light unit, the frame having a guide portion positioned along a first side of the frame positioned from an end portion of the frame by a first distance, the guide portion having a guide hole positioned to correspond to a hole through a portion of the frame, an open upper portion positioned along a lateral direction opposing the guide hole, and an overlapping portion overlapping the guide hole to form a boundary of the open upper portion, a chassis supporting and affixing the liquid crystal panel and the frame, a first wire connected to a first end of the light unit and inserted through the guide hole of the guide portion and the hole through the portion of the frame to be overlapped by the overlapping portion, and a second wire connected to a second end of the light unit and inserted through the open upper portion and the guide hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
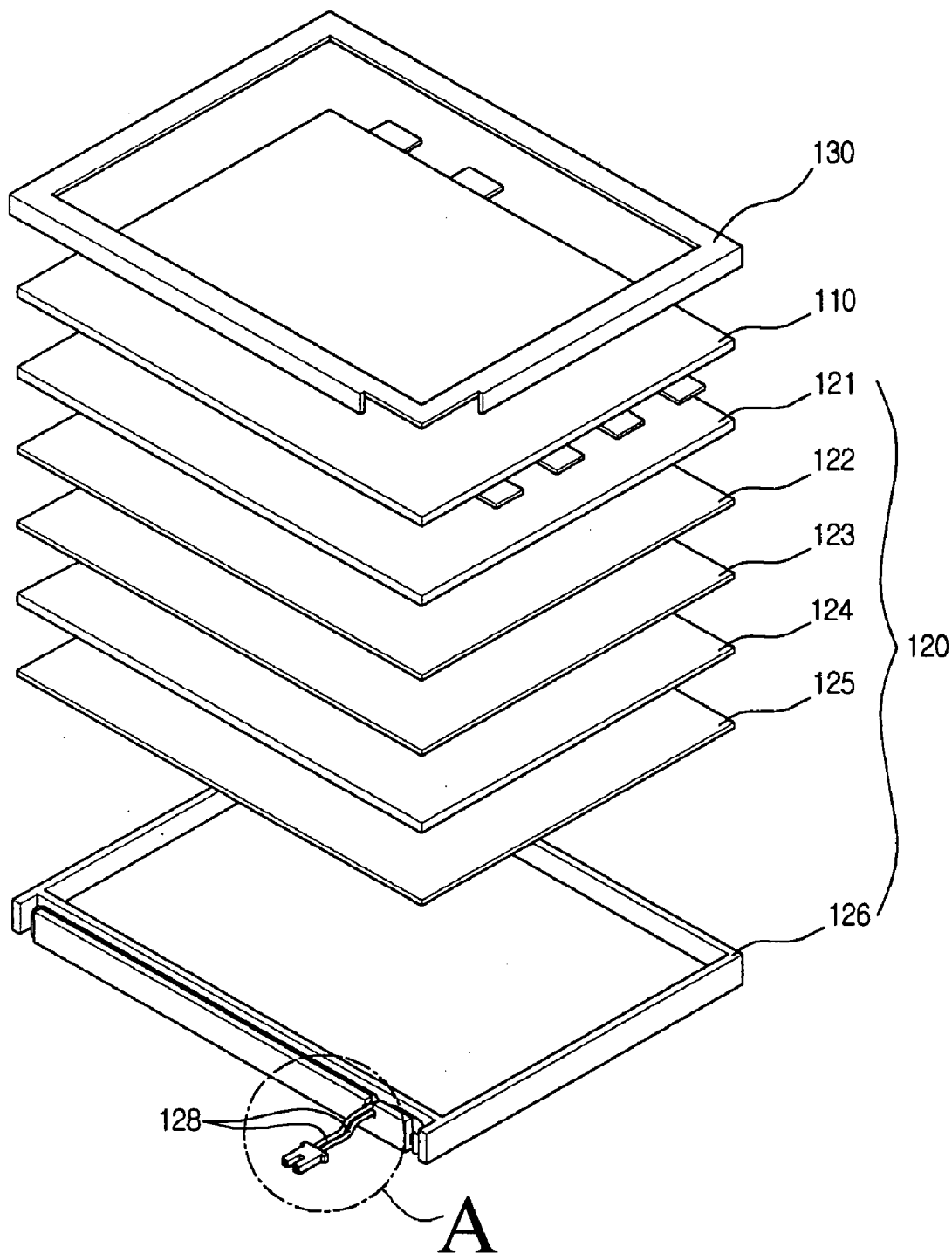
FIG. 1 is a schematic construction view of an LCD module device according to the related art.
Figure 2:
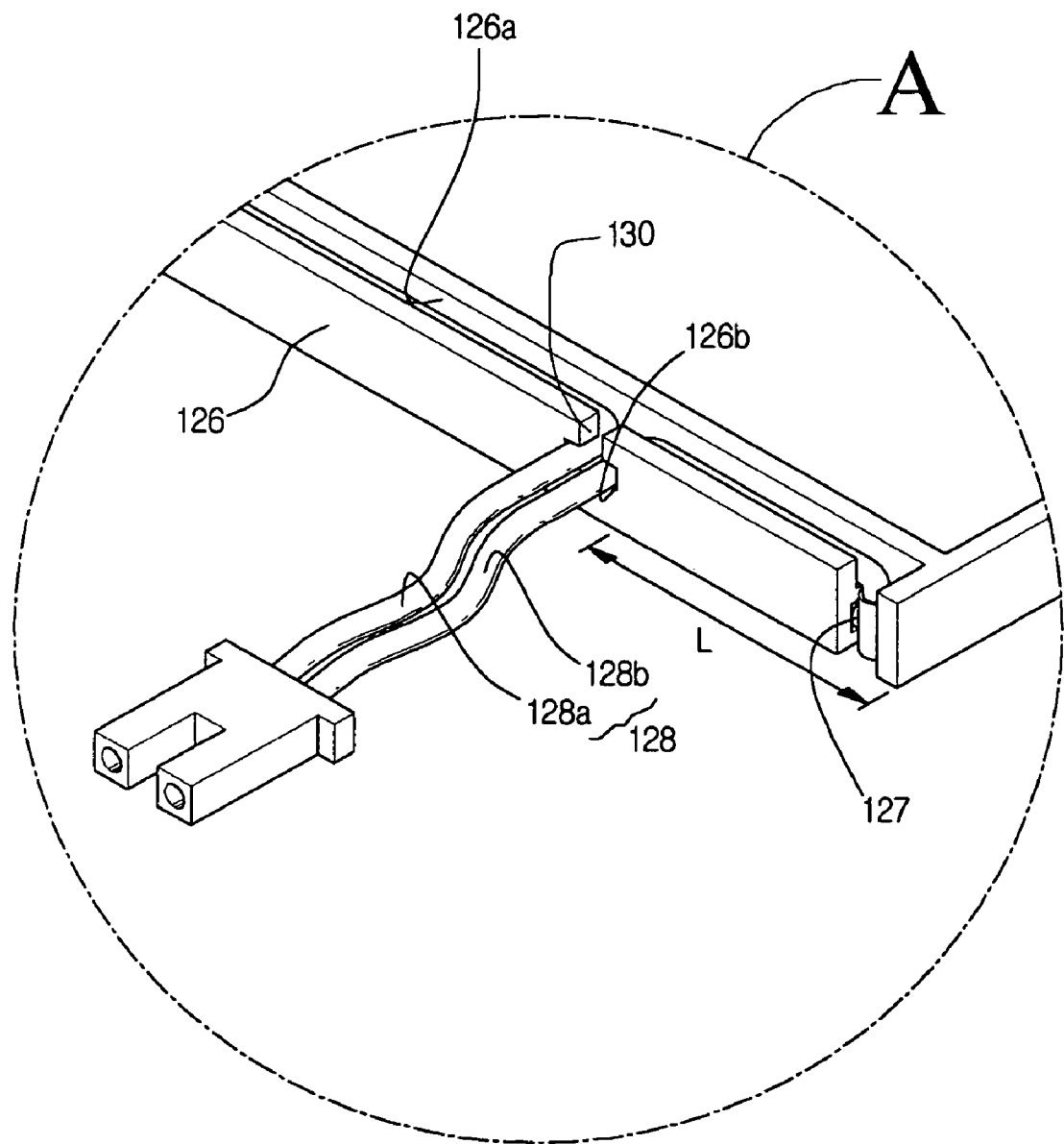
FIG. 2 is an enlarged perspective view of region A of FIG. 1 according to the related art.
Figure 3:
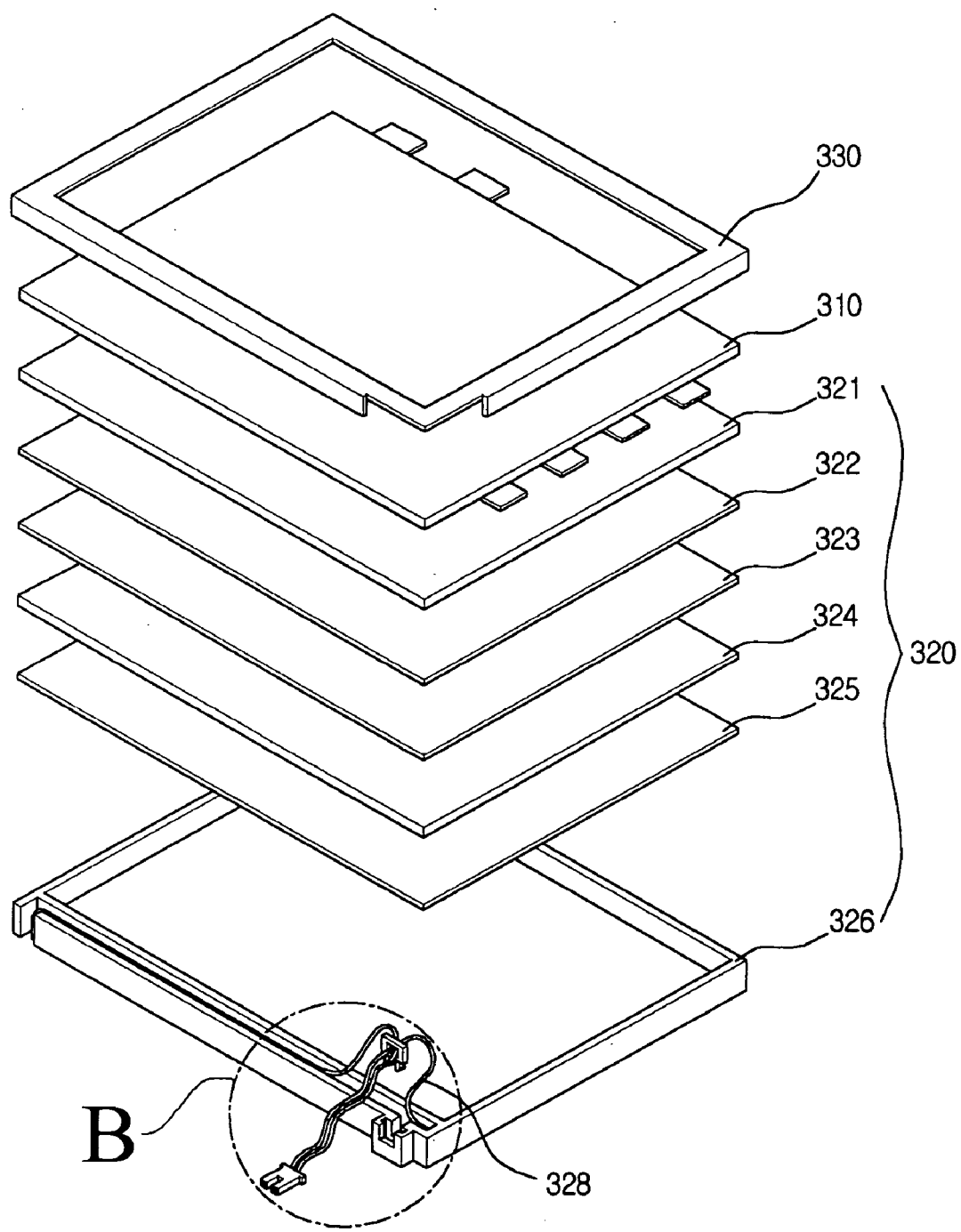
FIG. 3 is a schematic construction view of another LCD module device according to the related art.
Figure 4:
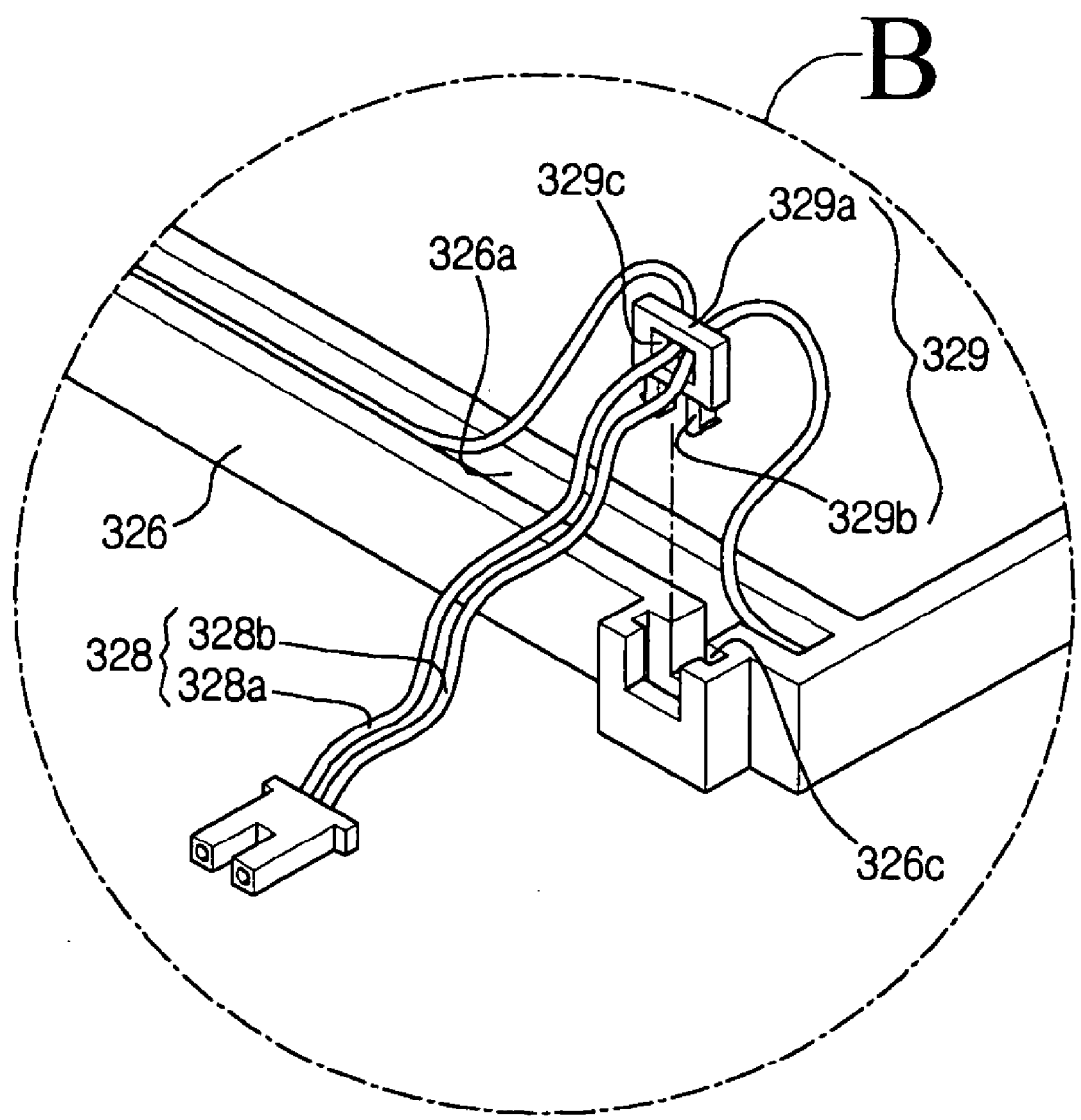
FIG. 4 is an enlarged perspective view of region B of FIG. 3 according to the related art.
Figure 5:
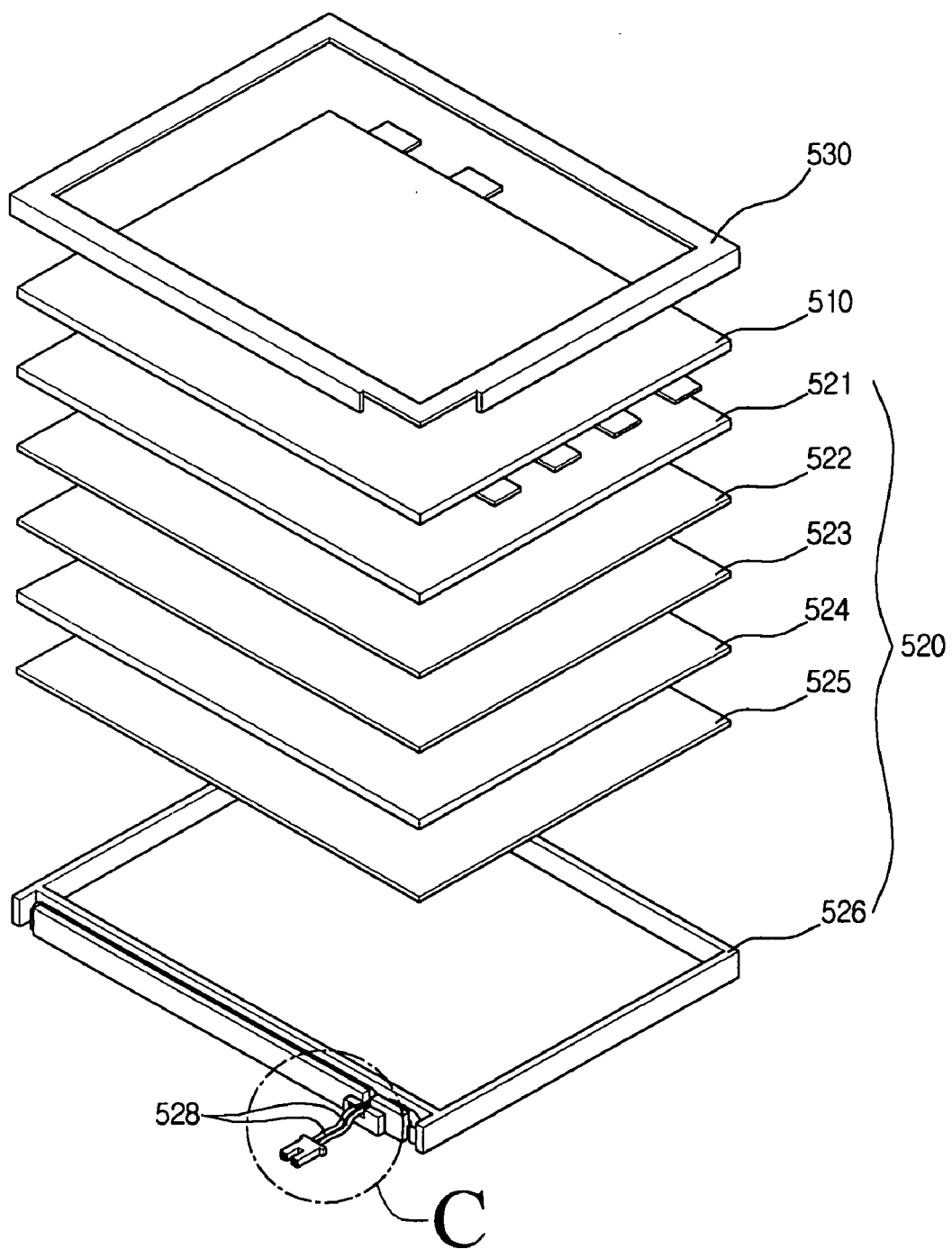
FIG. 5 is a schematic construction view of an exemplary LCD module device according to the present invention.
Figure 6:
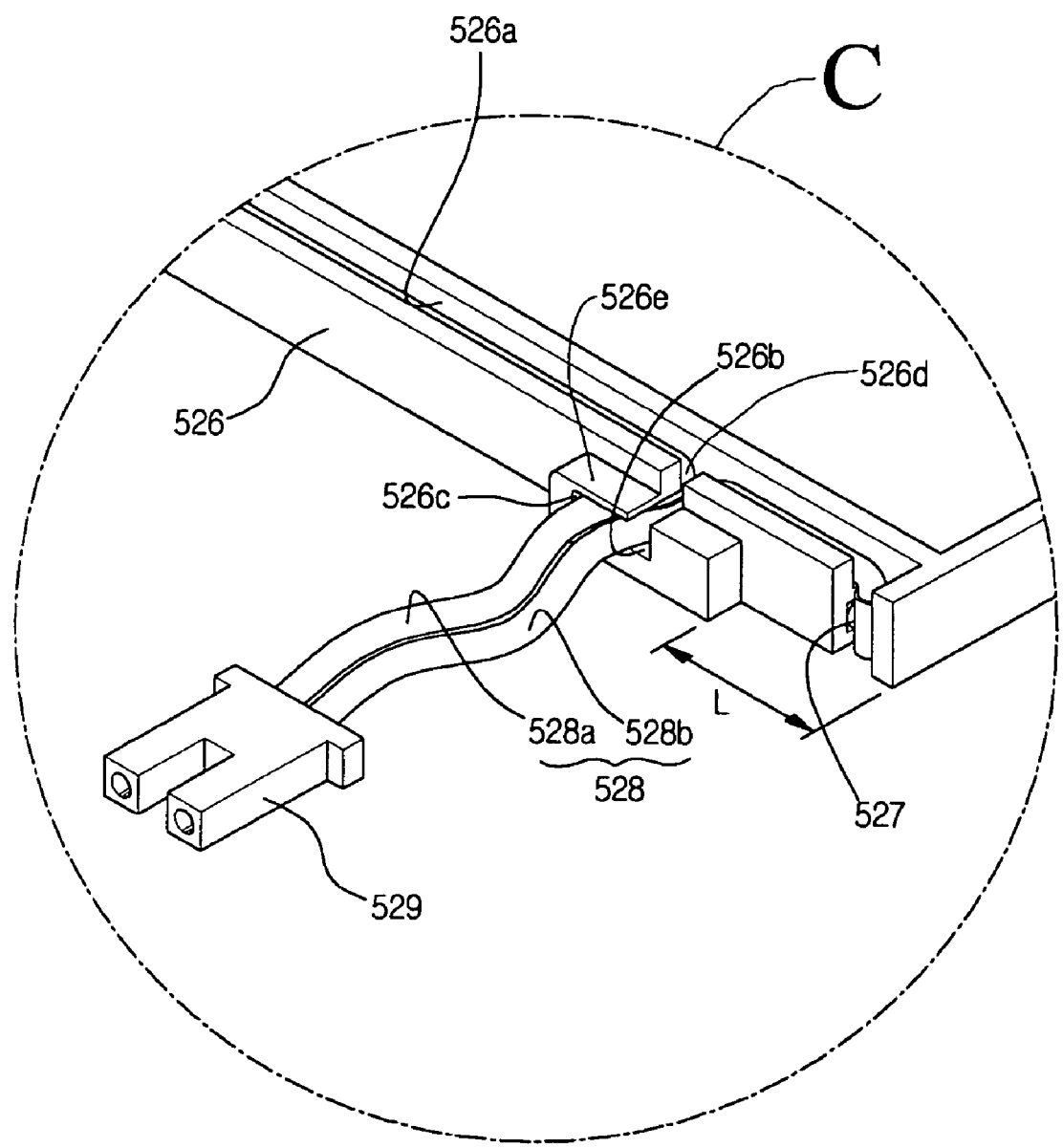
FIG. 6 is an enlarged perspective view of region C of FIG. 5 according to the present invention.

FIG. 5 is a schematic construction view of an exemplary LCD module device according to the present invention, and FIG. 6 is an enlarged perspective view of region C of FIG. 5 according to the present invention. In FIG. 5, an LCD module may include an LCD panel 510 for displaying images, a backlight assembly 520 may be provided at a rear side of the LCD panel 510 to function as a light source for the LCD panel 510, and a rectangular-framed metal chassis 530 for supporting and affixing the LCD panel 510 and the backlight assembly 520.

In FIG. 5 and FIG. 6, the backlight assembly 520 may include a diffuser sheet 521, a plurality of prism sheets 522 and 523, a light guide plate 523, and a reflector sheet 525, and a rectangular plastic mold frame 526 for positioning a light-source lamp unit 527 along a side corner thereof. Alternatively, the backlight assembly may include addition optical sheets, such as optical wave plates and various optical filters. The mold frame 526 may house and sequentially layer the diffuser sheet 521, the prism sheets 522 and 523, the light guide plate 524, and the reflector sheet 525. For example, the diffuser sheet 521, the prism sheets 522 and 523, the light guide plate 524, and the reflector sheet 525 may be made of optical sheet material.

A wire 528, which may include low-voltage and high-voltage wires 528*a* and 528*b*, is electrically connected to ends of the lamp unit 527 to supply an external power source to the lamp unit 527 via a connector 529. In addition, a guide portion 526b and a housing groove 526a may be disposed along a one-side frame portion of the mold frame 526, which may function to install the lamp unit 527 thereat. Accordingly, the guide portion 526b may support and pass through the low-voltage and high-voltage wires 528a and 528b at one point of the mold frame 526. The housing groove 526a may house and guide the low-voltage and high-voltage wires 528a and 528b to the guide portion 526b. The guide portion 526b may be spaced away by a distance (L) from an end portion of the mold frame 526. Accordingly, the low-voltage and high-voltage wires 528a and 528b may be configured to have a bend at regions of the mold frame 526 that respectively correspond to the guide portion 526b and the ends of the lamp unit 527. Alternatively, the guide portion 526b may be located more toward the end portion of the mold frame 526 to reduce the distance (L).

In FIG. 6, a guide hole 526c may be laterally provided from the guide portion 526b opposing an open upper portion 526d of the mold frame 526. In addition, the mold frame 526 may include an overlapping portion 526e that overlaps the guide hole 526c and forms a lateral boundary of the open upper portion 526d. In addition, the guide hole 526c may extend through the mold frame 526. Accordingly, the low-voltage wire 528a may be electrically connected to one of the ends of the lamp unit 527, and may be positioned within the guide hole 526c and along the housing groove 526a. In addition, the low-voltage wire 528a may be inserted through the guide hole 526c of the guide portion 526b and may be overlapped by the overlapping portion 526e. Similarly, the high-voltage wire 528b may be electrically connected to the other end of the lamp unit 527 and positioned within and along the housing groove 526a. In addition, the high-voltage wire 528b may be inserted through the guide hole 526c of the guide portion 526b in parallel with the low-voltage wire 528a to be positioned within the open upper portion 526d. According to the present invention, the low-voltage wire 528a is inserted at an internal side of the guide portion 526b. Thus, the low-voltage wire 528a may have a longer outlet length than the high-voltage wire 528b. Accordingly, the low-voltage wire 528a may have a longer outlet portion from the guide portion 526b than the high-voltage wire 528b.

Accordingly to the present invention, when an external tensile force is supplied to the low-voltage and high-voltage wires 528a and 528b, the applied tensile force may act entirely on the high-voltage wire 528b and only along one direction since the low-voltage wire 528a has the longer outlet length than the high-voltage wire 528b. As a result, the high-voltage wire 528b may be prevented from being released out through the opened upper portion of the guide portion 526b. In addition, the low-voltage wire 528a may be inserted into the guide hole 526c and retained along all x, y, and z coordinate directions such that the low-voltage wire 528a may be prevented from being released out through the opened upper portion 526d of the guide portion 526b. According to the present invention, manufacturing costs may be reduced and manufacturing processes may be simplified since separate additional support units may not be needed.

An exemplary assembly process according to the present invention, with reference to FIG. 6, may include installation of a lamp unit 527 along a side frame portion of the mold frame 526. Then, low-voltage and high-voltage wires 528a and 528b, which may be electrically connected to ends of the lamp unit 527, may be inserted into and along a housing groove 526a provided along the side frame portion of the mold frame 526. Next, the low-voltage wire 528a may be inserted into an internally bent lateral portion of a guide portion 526b through an opened upper portion 526d of the guide portion 526b. Then, the high-voltage wire 528b may be inserted downward through the opened upper portion 526d of the guide portion 526b. The guide portion 526b may be positioned close to an end of the lamp unit 527, wherein the low-voltage wire 528a may have a first length greater than a length of the high-voltage wire 528b.

According to the present invention, a guide portion may be installed closely to an end portion of a lamp unit, and a guide hole may be provided for the guide portion along with an open upper portion, wherein a lateral portion may be internally bent at a depth such that a first wire, which may be connected to a first end of the lamp unit, may be inserted into the guide hole, and a second wire, which may be connected to a second end of the lamp unit, may be intactly inserted downward through the opened upper portion. Accordingly, when an external tensile force is supplied to the first and second wires, the tensile force may only act on the first wire connected to the first end of the lamp unit along a lateral direction, thereby preventing the first and second wires from being released.

It will be apparent to those skilled in the art that various modifications and variations can be made in the backlight assembly and a LCD device having a backlight assembly of the present invention. Thus, it is intended that the present invention cover the modifications and variations of this invention provided they come within the scope of the appended claims and their equivalents.

What is claimed is:

1. A backlight assembly, comprising:
  a plurality of optical sheets;
  a light unit; and
  a frame housing the plurality of optical sheets and the light unit, the frame having a guide portion positioned along a first side of the frame, the guide portion defining a guide hole through the frame such that the guide hole has a shape laterally extended with respect to the frame, the guide portion further defining an open upper portion positioned at a lateral end of the guide hole;
  a first wire connected to a first end of the light unit and disposed through the guide hole of the guide portion and the hole through the portion of the frame to be overlapped by the overlapping portion; and
  a second wire connected to a second end of the light unit and disposed through the guide hole at a position laterally aligned with the open upper portion.

2. The backlight assembly according to claim 1, wherein the frame further comprises a housing groove extending along the first side of the frame and the first wire extends along the housing groove.

3. The backlight assembly according to claim 2, wherein the first wire has a first length longer than a second length of the second wire.

4. The backlight assembly according to claim 3, wherein a tensile force applied to the first and second wires acts on the second wire along the lateral direction.

5. The backlight assembly according to claim 1, wherein the guide portion is positioned from an end portion of the frame by a first distance.

6. The backlight assembly according to claim 5, wherein the end portion of the frame corresponds to the first end of the light unit.

7. A liquid crystal display, comprising:
  a liquid crystal panel displaying images thereon;
  a plurality of optical sheets positioned at a rear surface of the liquid crystal panel;

a light unit;

a frame housing the plurality of optical sheets and the light unit, the frame having a guide portion positioned along a first side of the frame, the guide portion defining a guide hole through the frame such that the guide hole has a shape laterally extended with respect to the frame, the guide portion further defining an open upper portion positioned at a lateral end of the guide hole;

a chassis supporting and affixing the liquid crystal panel and the frame;

a first wire connected to a first end of the light unit and disposed through the guide hole of the guide portion and the hole through the portion of the frame to be overlapped by the overlapping portion; and a second wire connected to a second end of the light unit and disposed through the guide hole at a position laterally aligned with the open upper portion.

8. The backlight assembly according to claim 7, wherein the frame further comprises a housing groove extending along the first side of the frame and the first wire extends along the housing groove.

9. The backlight assembly according to claim 8, wherein the first wire has a first length longer than a second length of the second wire.

10. The backlight assembly according to claim 9, wherein a tensile force applied to the first and second wires acts only on the second wire along the lateral direction.

11. The backlight assembly according to claim 7, wherein the guide portion is positioned from an end portion of the frame by a first distance.

12. The backlight assembly according to claim 11, wherein the end portion of the frame corresponds to the first end of the light unit.

* * * * *